US011506379B2

(12) United States Patent
De Avila Rueda

(10) Patent No.: US 11,506,379 B2
(45) Date of Patent: Nov. 22, 2022

(54) CATALYTIC OXIDIZER

(71) Applicants: Luis Calisalvo Duran, Madrid (ES); Victor De Avila Rueda, Madrid (ES)

(72) Inventor: Victor De Avila Rueda, Madrid (ES)

(73) Assignees: Victor De Avila Rueda, Madrid (ES); Luis Calisalvo Duran, Madrid (ES)

( * ) Notice: Subject to any disclaimer, the term of this patent is extended or adjusted under 35 U.S.C. 154(b) by 0 days.

(21) Appl. No.: 16/965,496

(22) PCT Filed: May 7, 2018

(86) PCT No.: PCT/ES2018/070343
§ 371 (c)(1),
(2) Date: Jul. 28, 2020

(87) PCT Pub. No.: WO2019/215351
PCT Pub. Date: Nov. 14, 2019

(65) Prior Publication Data
US 2021/0048189 A1    Feb. 18, 2021

(51) Int. Cl.
*F23C 9/00*    (2006.01)
*F23B 30/00*    (2006.01)
(Continued)

(52) U.S. Cl.
CPC .............. *F23C 9/006* (2013.01); *F23B 5/025* (2013.01); *F23B 7/007* (2013.01); *F23C 3/006* (2013.01);
(Continued)

(58) Field of Classification Search
CPC .. F23C 9/006; F23C 9/00; F23C 3/006; F23B 5/025; F23G 5/008; F23G 5/24;
(Continued)

(56) References Cited

U.S. PATENT DOCUMENTS 3,648,629 A * 3/1972 Southwick ................ F23G 5/24
110/243
3,658,017 A * 4/1972 Dibelius ................... F23G 5/32
110/244

(Continued)

FOREIGN PATENT DOCUMENTS

EP    1091172 A1    4/2001
EP    1486729 A1    12/2004
(Continued)

*Primary Examiner* — David J Laux
(74) *Attorney, Agent, or Firm* — Hayes Soloway PC

(57) ABSTRACT

The invention comprises: a) first comburent supplying means (18) connected to the lower part of the oxidation chamber, for introducing pressurized oxygenated gas in the oxidation chamber at a speed that comprises a tangential component; b) a particle recirculation system, which comprises: a particle separator (24) on the upper part of the oxidation chamber for trapping hot particles of ash and unburned material, and a transportation system (25) for transferring trapped particles from the particle separator (24) to the base of the oxidation chamber; and c) a gas recirculation system comprising: a sucker (26) for suctioning combustion gases from the upper part of the oxidation chamber, and pipes (27) for transferring the suctioned gases to the base of the oxidation chamber. It provides an optimized thermal transfer that reduces the emission of pollutants in waste recovery.

20 Claims, 3 Drawing Sheets

(51) Int. Cl.
*F23G 5/00* (2006.01)
*F23G 5/24* (2006.01)
*F23G 5/32* (2006.01)
*F23C 3/00* (2006.01)
*F23J 15/02* (2006.01)

(52) U.S. Cl.
CPC ............... *F23C 9/00* (2013.01); *F23G 5/008* (2013.01); *F23G 5/24* (2013.01); *F23G 5/32* (2013.01); *F23J 15/02* (2013.01); *F23C 2203/30* (2013.01); *F23G 2202/30* (2013.01); *F23G 2205/121* (2013.01); *F23J 2217/20* (2013.01)

(58) Field of Classification Search
CPC ... F23G 5/32; F23J 2217/20; F23J 3/04; F23J 15/022; F23J 15/025; F23J 15/027
See application file for complete search history.

(56) References Cited

U.S. PATENT DOCUMENTS

| | | | | |
|---|---|---|---|---|
| 3,727,563 A | * | 4/1973 | Hasselbring | F23G 5/32 110/244 |
| 4,159,000 A | * | 6/1979 | Iwasaki | F23G 5/32 110/259 |
| 4,300,460 A | * | 11/1981 | Lamb | F23G 5/50 110/283 |
| 4,598,653 A | * | 7/1986 | Stringfellow | F23C 10/002 110/263 |
| 4,745,884 A | * | 5/1988 | Coulthard | F23C 10/10 431/170 |
| 4,815,418 A | * | 3/1989 | Maeda | F22B 31/0015 122/4 D |
| 4,976,209 A | * | 12/1990 | Piggin | F23G 5/12 110/235 |
| 5,050,512 A | * | 9/1991 | Tratz | F23J 9/00 110/235 |
| 5,370,065 A | * | 12/1994 | Christensen | F23G 5/165 110/238 |
| 5,513,599 A | * | 5/1996 | Nagato | C10J 3/86 60/39.464 |
| 5,755,166 A | * | 5/1998 | Andersson | B04C 3/00 110/213 |
| 6,161,490 A | * | 12/2000 | Fujinami | C10J 3/482 110/259 |
| 6,269,755 B1 | * | 8/2001 | Boswell | F23G 7/10 110/263 |
| 6,321,665 B1 | * | 11/2001 | Uchida | F23G 5/32 110/297 |
| 2010/0040508 A1 | * | 2/2010 | Dodson | F23G 5/32 422/198 |
| 2011/0100272 A1 | * | 5/2011 | Hasselbring | F23J 15/027 110/244 |
| 2017/0248307 A1 | * | 8/2017 | George | F23G 5/32 |
| 2018/0163962 A1 | * | 6/2018 | Geselle | F23G 5/442 |
| 2020/0056785 A1 | * | 2/2020 | VanNatta | F23G 5/24 |

FOREIGN PATENT DOCUMENTS

| | | |
|---|---|---|
| JP | S50116974 U | 9/1975 |
| JP | H07332638 A | 12/1995 |

* cited by examiner

A-A'

CATALYTIC OXIDIZER

CROSS-REFERENCE TO RELATED APPLICATIONS AND PRIORITY

This patent application claims priority from PCT Patent Application No. PCT/ES2018/070343 filed May 7, 2018. This patent application is herein incorporated by reference in its entirety.

OBJECT OF THE INVENTION

The present invention can be included within the technical sector of waste recovery, in particular in recovery by means of incineration. More specifically, the object of the present invention is a catalytic oxidizer for waste energy recovery, which provides greater combustion efficiency and releases reduced amounts of pollutants.

BACKGROUND OF THE INVENTION

European patent application EP1486729A1 describes an incinerator comprising a combustion chamber provided with an inner wall, as well as a plurality of combustion-promoting fluid-spraying tubes, disposed so as to project from one position on the inner wall, extended in the vertical direction thereof, and led to the outside of the combustion chamber from the other positions. The combustion-promoting fluid-spraying tubes are formed in a triple concentric tube structure which comprises: an air supply tube, located furthest inside; a steam/gas supply pipe, located immediately outside the air supply tube for supplying steam and/or inflammable gas, and a water tube, located furthest to the outside. Spraying holes are formed in the combustion promoting fluid spraying tubes at positions facing one circumferential direction of the combustion chamber so that combustion promoting fluid sprayed from the spraying holes cause a high speed swirl flow in the combustion chamber.

On the other hand, European patent application EP1091172A1 describes an incinerator that includes a cylindrical combustion chamber, as well as an air chamber inside the combustion chamber for supplying air to the combustion chamber through a blower. It has air supply pipes (configured in ⊃ shape) installed in the air chamber attached to the air chamber and oriented towards the center of the incinerator. The area around the air supply pipes (configured in ⊃ shape) forms the center of the combustion chamber. Furthermore, air supply branch pipes are installed on one side of the horizontal pipes of the upper and lower air supply pipes, which maintain constant air to be blown out in a constant direction at all times. The compressed air blown out from the air supply branch pipes from the horizontal pipe circulates in the combustion chamber. Air supply branch pipes are vertically and horizontally staggered on the vertical side of the air supply pipe (configured in ⊃ shape), which will enable air to be blown out in various directions. Furthermore, by having a steam generator and a liquid storage device, the incinerator is able to handle all types of waste.

DESCRIPTION OF THE INVENTION

The present invention describes a catalytic oxidizer for catalytically treating different types of waste, which provides improved energy efficiency and a reduction in pollutant emissions.

The catalytic oxidizer in accordance with the invention has the function of recovering waste, and to do so it comprises a cylindrical oxidation chamber, intended to be fed with waste that is catalytically oxidizable, and which comprises a chamber body and at least one wall that surrounds the outer part of the chamber body.

The waste reaches the inside of the reaction chamber (specifically, the chamber body) through waste feeding means.

The invention is characterized by comburent supplying means, which comprise first comburent supplying means, connected to the lower part of the oxidation chamber, for introducing pressurized oxygenated gas in the oxidation chamber at a speed that comprises a tangential component.

Moreover, the oxidizer incorporates a particle recirculation system which, in turn, comprises a particle separator, on the upper part of the oxidation chamber, for trapping hot particles of ash or unburned material, and a transportation system for transferring the trapped particles from the separator to the base of the oxidation chamber.

Through gas recirculation system, gases are collected from the upper part of the combustion chamber through a sucker and returned to the lower part of the combustion chamber through pipes in order to utilize the enthalpy of the combustion gases.

DESCRIPTION OF THE DRAWINGS

As a complement to the description being made, and for the purpose of helping to make the characteristics of the invention more readily understandable, in accordance with a preferred practical exemplary embodiment thereof, said description is accompanied by a set of drawings constituting an integral part thereof which, by way of illustration and not limitation, represent the following.

PREFERRED EMBODIMENT OF THE INVENTION

Figure 1:
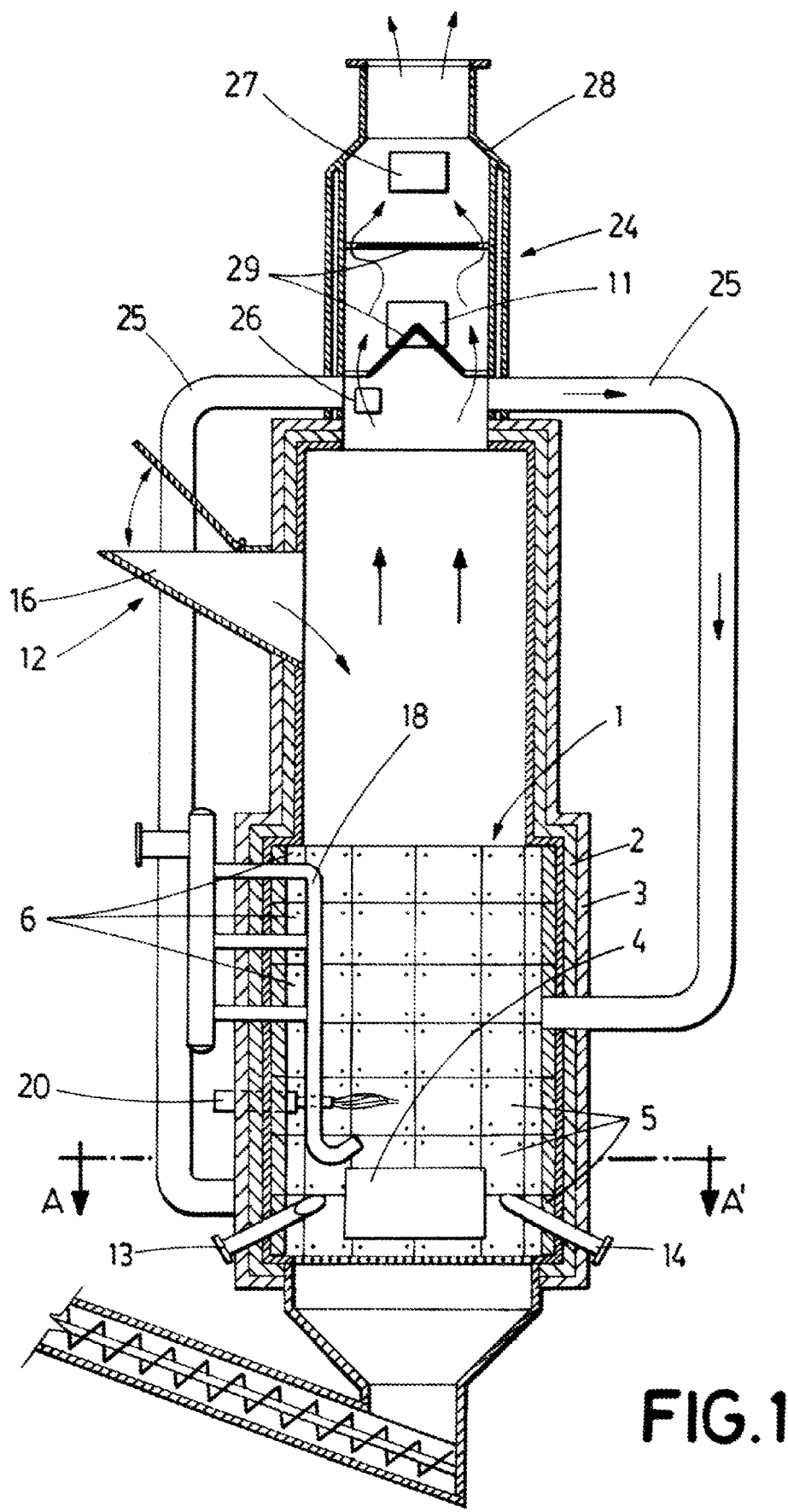
FIG. 1 shows an elevated cross-sectional view of the catalytic oxidizer object of the invention.
Figure 2:
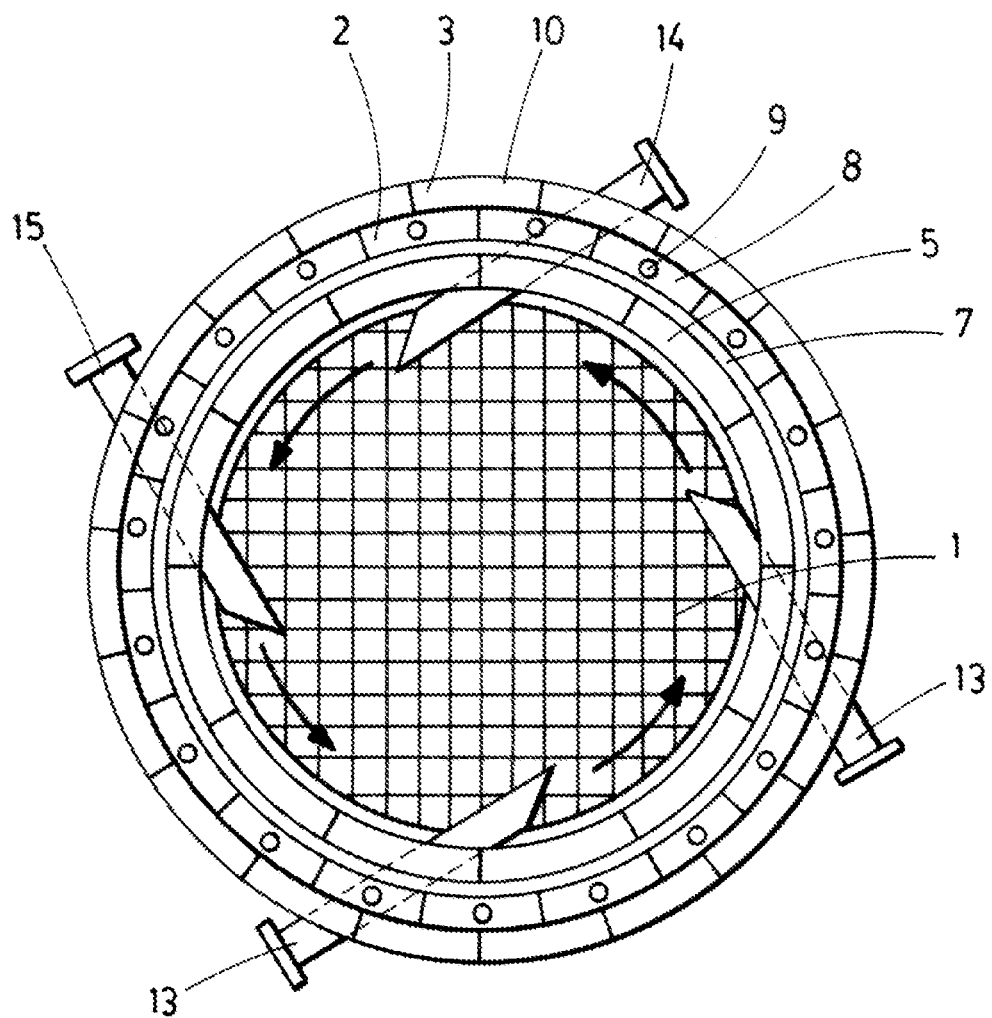
FIG. 2 shows cross-sectional view of through plan A-A' of FIG. 1.
Figure 3:
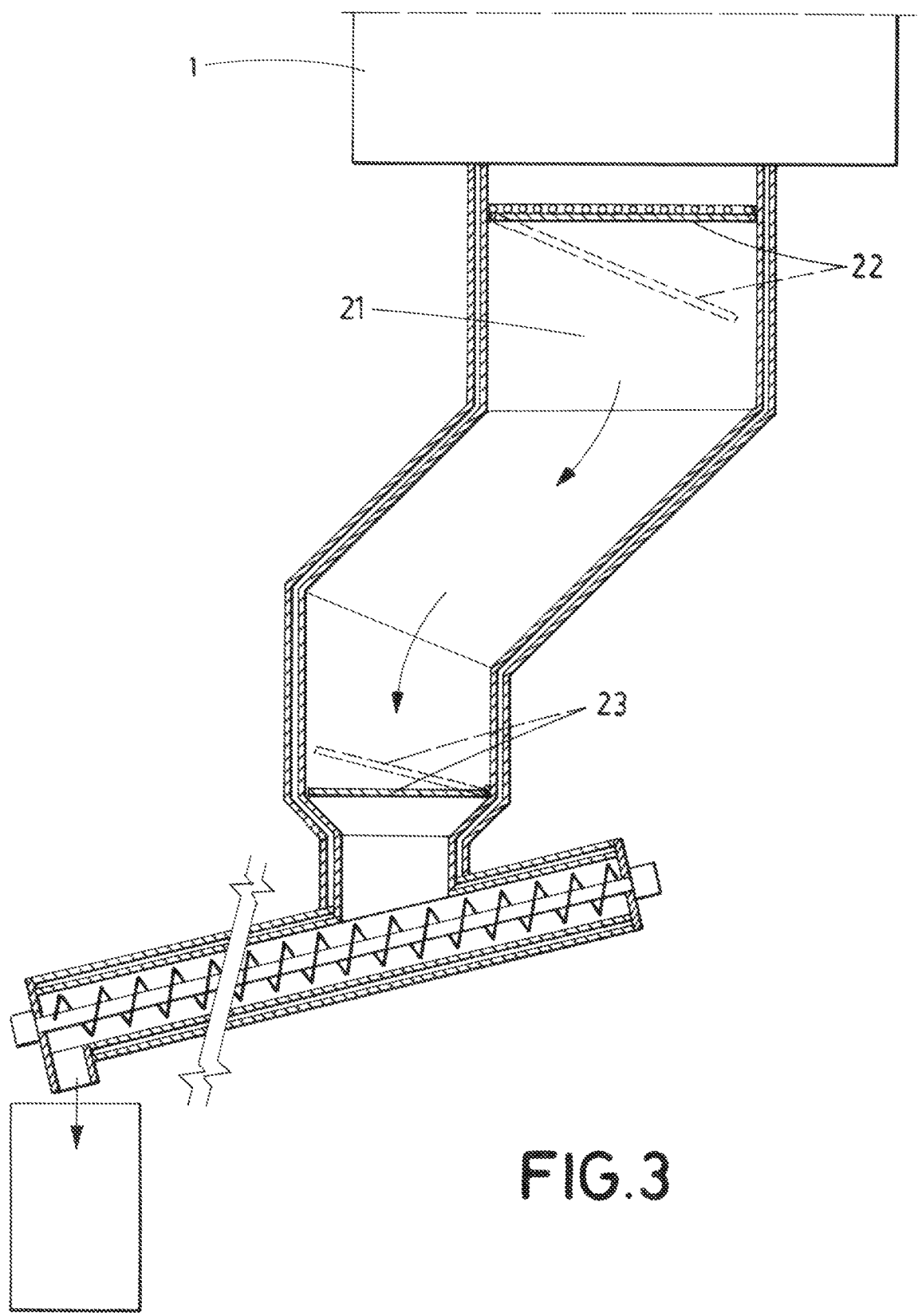
FIG. 3 shows a detailed diagram of an ash and slag removal system.

A detailed description is provided below, with the help of the aforementioned attached FIGS. 1-3, of a preferred embodiment of a catalytic oxidizer object of the present invention.

The present invention describes a catalytic oxidizer designed for thermally treating any material, specifically (and preferably) waste material, which contains oxidizable elements. The process is based on reducing the flash point and providing a greater level of oxygen without increasing the nitrogen level. As will be explained below, by means of the catalytic oxidizer of the present invention, the ignition temperature is reduced by 20%, which improves the efficiency of the catalytic oxidation process. The material of which the oxidizer is made, and the use of a specific volume of ash, lead to greater energy efficiency of the chemical reactions of oxidation (in particular of combustion) produced, which translates to greater fuel consumption efficiency (given a predetermined output) and a reduction in the formation of pollutant compounds.

The catalytic oxidizer comprises a cylindrically shaped oxidation chamber intended to be fed with waste to be catalytically oxidized, specifically, incinerated, by catalytic combustion. The oxidation chamber comprises a chamber body (1) preferably made of stainless steel, and at least one protective wall (2, 3), preferably made of refractory material, which surrounds the chamber body (1) on the outside. Preferably, the chamber body (1) is surrounded on the outside by two protective materials (2, 3) arranged coaxially: a first protective wall (2) further inside and a second protective wall (3) further outside.

The oxidation chamber can be interiorly coated with a heat shield of protective plates (5, 6) fixed to the chamber body (1). Preferably, the protective plates (5, 6) of the heat shield comprise first protective plates (5) on the lower part, the aim of which is to protect the combustion chamber from high temperatures as well as corrosion and wear. The first protective plates (5) can be, for example, made of stainless steel or a superior material. Likewise, the heat shield can include second protective plates (6) on the upper part to protect the oxidation chamber from high temperatures.

The second protective plates (6) can be, for example, made of steel, although they do not have to be stainless steel, but could rather be carbon steel or similar. The protective plates (5, 6) are preferably fixed to the chamber body in a separable way, which allows the protective plates (5, 6) to be substituted when they are deteriorated due to wear or the effects of the temperature or for a pre-programmed maintenance. An additional effect of the presence of the heat shield is to reflect energy toward the inside of the oxidation chamber. Optionally, between the first protective wall (5) and the chamber body (1) a heat-insulating coating (7) can be arranged, such as carbon fiber, porcelain material, etc.

The oxidation chamber further comprises cooling means for cooling the first protective wall (5) and the second protective wall (6). In particular, the cooling means comprise a liquid cooling jacket (8) which coats the inside of the first protective wall (2) with a cooling liquid, such as water, to cool said first protective wall (2). Additionally, the cooling means can include cooling tubes (9) inside of the first protective wall (2), surrounded by the liquid cooling jacket (8), through which the cooling liquid, such as water, circulates. The liquid cooling jacket (8) is preferably fed with liquid (such as water) coming from a tank (not shown) which can be, for example, a condensate tank. The cooling liquid that circulates through the cooling tubes (9) transforms into steam by absorbing the heat from the oxidation chamber, which can subsequently be used after optionally passing through a degasser (not shown) in a steam generator or in a heat exchanger to utilize the thermal energy thereof at low pressure. On the other hand, the cooling means can additionally include an air jacket (10) which coats the second protective wall (3) to cool said second protective wall (3).

The coolant and the cooling liquid can circulate through the liquid cooling chamber (8) and the cooling tubes (9), respectively, through the respective cooling inlets and outlets (not shown), which can preferably be located in diametrically opposite locations of the chamber body (1).

On the lower part, the chamber body (1) is provided with a first door (4) to allow operators and machinery to have access for tasks of inspection, maintenance and repairs. The first door (4) is preferably internally cooled by a liquid, such as water.

The catalytic oxidizer is capacitated to receive oxidizable waste in the oxidation chamber that is in different states of aggregation: gaseous waste, liquid waste, powdered waste and solid waste with a size of up to 30 cm, for example. Specifically, the oxidizer can be fed, both simultaneously and separately, with waste of nature and states of aggregation. Therefore, the catalytic oxidizer comprises waste-feeding means (12, 13, 14, 15). Specifically, the waste-feeding means (12, 13, 14, 15) comprise solid feeding means (12) powder feeding means (13), gas feeding means (14) and liquid feeding means (15).

According to one example, the solid feeding means (12) are attached to the upper part of the oxidation chamber. On the other hand, the powder feeding means (13), gas feeding means (14) and liquid feeding means (15) are preferably attached to the lower part of the oxidation chamber. The feeding means (12, 13, 14, 15) can have mechanisms known in the state of the art, based on the state of aggregation of the waste, for example: worm screws, belts, tubing, hoppers, etc.

With respect to the feeding of solids, it preferably has a hatch for the entrance (16) on the middle part of the oxidizer, which allows for the dumping of a material (either without being ground or before being ground) of, for example, up to a maximum dimension of 30 cm, from where it falls due to gravity to the center of the oxidation chamber to be oxidized. In the specific case of biomass, a helical screw or a conveyor belt is preferably used, in both cases optionally actuated by a motor provided with a speed shifter. A dynamic weigh hopper can optionally be installed before the belt or screw to control the amounts of waste, especially in the case of biomass. The solid waste being fed does not necessarily have to be homogenous in size or in composition.

With regard to feeding liquids, powders and gas, the corresponding liquid (15), powder (13) and gas (14) feeding means, located on the lower part of the oxidation chamber, introduce the waste in a tangential way, to lower the impact of the waste on the operation of a vortex (17) that is formed in the center of the lower part of the oxidation chamber, such that the speed and the pressure of an oxygenated gas provided as an oxidant causes the oxidized particles to circulate attached to the chamber body (1) so that the ash produced is captured in the upper part and can be recovered in the lower part of the oxidation chamber together with the unburned material pulled by the vortex (17).

The catalytic oxidizer additionally incorporates comburent supplying means, for introducing oxygenated gas into the oxidation chamber, for example being either pure oxygen, air or any other gas or mixture of gases. The comburent supplying means comprise first comburent supplying means (18), which are connected to the middle part of the oxidation chamber, for introducing pressurized air at a speed that comprises a tangential component, preferably also an upward component. Optionally, the comburent supplying means can further include second comburent supplying means for providing atmospheric air.

To provide an idea of the scope of the oxidizer object of the present invention, some dimensioning information is provided below. The oxidizer can manage 50 tons of waste daily, operating 24 hours a day.

Considering a relation of 12 kg of air per kg of waste, plus excess air (taken to the extreme) of 30%, the airflow would be 37500 kg/h. To be on the safe side, if we consider an air flow of 40000 kg/h, said air flow can be supplied by, for example, four CRIT-2D-712-30 Kw turbofans (by Soler y Palau), not shown, the nominal and maximum flow of which are 10000 and 1350 $m^3$/h at sea level, respectively.

To carry out the oxidation (catalytic combustion) of the waste, the oxidation chamber incorporates a furnace wherein a flame is maintained that burns the mixed waste and comburent. By way of example, the furnace can comprise an entrance for ignition, for supplying a fuel for ignition, such as natural gas, as well as a torch (20), preferably retractable, to light the flame in each start up of the furnace. The furnace can further comprise a support entrance for supplying a support fuel, such as fuel oil or natural gas, to maintain a necessary calorific support in the case that the waste is not enough to obtain a minimal threshold temperature for an adequate operation, such as 850-900° C.

On the other hand, the ignition fuel, for example natural gas, is preferably provided through a line equipped with a system of manometers and pressure regulators that control the feeding conditions, so as to prevent risk in the managing thereof. A machine such as the one described in the present invention is extraordinarily flexible, given that it can work with solids.

A preferred method is described below, by way of example, for starting the oxidation chamber. First, a layer of waste is arranged, such as biomass, in the lower part of the oxidation chamber, referred to as "base". Then, the ignition fuel is supplied, until reaching an operating temperature. Supplementary feeding of waste (for example biomass) is then initiated, maintaining the operating temperature. The supply of ignition fuel is progressively reduced and the waste supply is progressively increased until the operation is self-sustainable with only waste. To prevent points in which combustion is produced at a temperature lower than the operating temperature, the temperature of the oxidizer during the startup is, preferably, slightly greater than the operating temperature (for example, around 5%, i.e. 900° C.). If the temperature decreases below a predetermined threshold value, for example 5% greater than the operating temperature) an additional amount of ignition fuel is activated. Once the operation is established, it is maintained stable until a controlled extinguishing is carried out, if necessary.

Inside the catalytic oxidizer combustion gases circulate, as well as, as will be explained in further detail below, flying ash and unburned material that are products of the exothermic reactions. Given that the ash and the unburned material are transferred through the catalytic oxidizer, they contribute to transferring the elevated thermal energy thereof. This way, the temperature is kept stable inside the catalytic oxidizer, especially inside the oxidation chamber. On the other hand, one part of the ash and the unburned material is deposited in the base of the oxidation chamber due to gravity, which serves as a heat reservoir, reducing the ignition temperature and thereby accelerating the oxidation. In other words, the thermal energy carried by the ash and the unburned material favors oxidation of the waste, either during the circulation thereof through the oxidation chamber, as well as when it accumulates on the base of said oxidation chamber.

The catalytic oxidizer has a removal system to remove ash and slag, preventing an indefinite accumulation that would end up blocking the oxidation chamber. The extraction system comprises a gate (21) and at least one hatch (22, 23). In particular, a first hatch (22) is moveable or tilted in a controlled way to allow the particles to pass to the gate (21), from which they are removed. The first hatch (22) can be cooled by water. To prevent the removal of hot particles, the extraction system can preferably include a second hatch (23), also moveable or tilted in a controlled way, to remove the particles, once cooled, from the gate (21). In this sense, a control unit can order the movement or tilting of the first hatch (22) and, if necessary, of the second hatch (23) based on the volume of accumulated particles, on the weight, the temperature, etc.

The oxidation chamber requires excess air, which should be kept at relatively low levels to prevent the formation of $NO_x$ compounds. In particular, the excess air is preferably around 15% for carrying out the correct oxidation of the waste fed. Additionally, it has been concluded that the supply of air at pressure for generating the cyclonic vortex (17) inside the oxidation chamber provides improvements that will be discussed below. In particular, the first oxidant providing means (18), as was previously explained, provide an inlet for oxygenized gas (generally air) at pressure, provided with a speed that has a tangential component in order to create a vortex, and, preferably, also an upward component.

As a result, the action of the pressurized air and the presence of ash and unburned material create the vortex (17) with high turbulence which, along with the cylindrical form of the combustion chamber, help the oxidation process and increase the particle residence time, going from 2 s, which is a typical residence time of other available technologies, to more than 4 s, with temperatures greater than 900° C. On the one hand, the vortex (17) causes the gases to move in a radial direction, instead of an essentially vertical direction, which helps to prolong the residence time. On the other hand, the vortex (17) causes the waste to intimately mix with the oxygen, thereby accelerating the oxidation of carbon and hydrogen and thus improving oxidation. This produces a very high mixture of oxygen with halogens throughout the entire oxidizer, and as a result the halogens are oxidized with greater ease and are therefore eliminated, due to the increased permanence time. It also allows the oxygen levels at the end of the oxidation zone to be maintained above the necessary levels to ensure a complete oxidation.

Additionally, the creation of high turbulence generated by the vortex (17) inside the oxidation chamber helps prevent the formation of cold points and allows the temperature of the catalytic oxidizer to remain uniform as a function of the height, meaning, it generates radial isotherms, which eliminate/reduce the creation of unburned material. Such a high oxidation speed achieved is the key so that even when using materials of the same calorific value, high temperatures can be reached more quickly.

The first comburent supplying means (18) ensure a high cyclonic air speed in the base of the oxidation chamber. To achieve this, said first comburent supplying means (18) comprise nozzles with a large diameter to provide a high outflow speed of the air. Additionally, the nozzles have a larger diameter (for example, twice as large) in the lower part of the oxidation chamber, with respect to the upper part. This way, feeding oxygenated gas is more efficient and suitable to the levels of oxygen that are required to achieve a complete oxidation. The nozzles are cooled on the outside, (for example by means of water) to be able to withstand the high operating temperatures in the base of the oxidation chamber, which are approximately 900° C.

As previously indicated, the ash and unburned material have a very important role in the efficiency of the catalytic oxidizer of the invention. In particular, the oxidation chamber incorporates a recirculation system for recirculating the ash and unburned material, wherein the recirculation system comprises a particle separator (24), arranged on the upper part of the oxidation chamber for trapping hot particles of ash or unburned fuel, and a transportation system, such as pipes (25), for example, for transferring the trapped particles from the particle separator (24) to the base of the oxidation chamber. Likewise, the particle separator (24) is preferably cooled by water, to be able to withstand the high temperatures, both of the gases as well as the particles of ash and unburned material. The particle separator (24) allows particles that have not been energetically recovered (oxidized) in a suitable way to be trapped in the oxidation chamber.

Preferably, the recirculation system can additionally incorporate a sucker (26) to suction the combustion gases from the upper part of the oxidation chamber, where the combustion gases are transferred to the base of the oxidation chamber together with the ash and the unburned material by transportation means (27), in particular, through the pipes.

To improve the efficiency of the recirculation system, a plurality of pipes (27) may be arranged. There are preferably three pipes (27) which can be arranged separated by 90°, as shown in FIG. 1, wherein two of the three pipes (27) can be seen.

Preferably, the particle separator (24) functions by collision, without needing moisture, and therefore comprises a casing (28) provided with a lower opening for receiving combustion gases along with the unburned particles and ash, and an upper opening for allowing the exit of combustion gases. Inside the casing (28) there is at least one shock body (29) configured and arranged to intercept the gases, ash and unburned material, such that the gases surround the shock body (29) and abandon the separator through the upper opening, and the particles are retained, to be recovered by the aforementioned transportation system (25) and taken to the base of the oxidation chamber. The transportation system (25) can include elements such as worm screws or equivalent means for transferring particles to transportation pipes to take them to the base of the oxidation chamber. According to a preferred example, in the particle separator (24), at least the shock body or bodies (29) are able to be separated for the substitution thereof. The casing (28) is preferably cooled, for example, by water.

The particle separator (24) can comprise a second door (11) in the lower part and a third door (27) in the upper part, to allow operators and instruments to access the same for inspections, repairs and maintenance. The second door (11) and the second door (27) are preferably internally liquid-cooled by a fluid, such as water.

The gases that exit the catalytic oxidizer are substantially more free of pollutant elements, and therefore said gases can be subsequently utilized in the waste heat boiler to obtain high quality steam.

The catalytic oxidizer of the invention stands out for its reduced thermal inertia, due to the composition of the walls thereof, lacking refractory brick, and thus the startup and the shutdown are notably simplified, thereby reducing the maintenance costs as well as the fuel consumption costs necessary for reaching the reference temperature.

On the other hand, given that the majority of the ash and unburned particles are internally recovered, the need to include additional filtering systems is reduced or eliminated.

Furthermore, the catalytic oxidizer has a small number of mobile pieces, and therefore the maintenance cost is considerably reduced.

Lastly, the catalytic oxidizer is fed with an excess of relatively reduced oxygen, around 15%, leading to a very reduced generation of the $NO_x$, which in turn reduces the needs for equipment for treating said $NO_x$ polluting gases.

The invention claimed is:

1. A catalytic oxidizer for reusing waste, which comprises:
    a cylindrical oxidation chamber, intended to be fed with catalytically oxidizable waste, and which comprises a chamber body and at least one wall that surrounds an outer part of the chamber body;
    a waste feeder which feeds the cylindrical oxidation chamber with oxidizable waste;
    a comburent supplier, which comprises nozzles connected to a lower part and a middle part of the cylindrical oxidation chamber and oriented in a tangential direction directing pressurized oxygenated gas in the oxidation chamber, and
    a recirculation system, which comprises:
        a particle separator in the upper part of the cylindrical oxidation chamber comprising a trap wherein hot particles of ash and unburned material are trapped, and
        a transporter comprising a lower pressure zone relative to the pressurized oxidation chamber whereby the lower pressure suctions the particles trapped in the particle separator, together with the combustion gases accompanying the hot particles of ash and the unburned material, from the separator to the base of the cylinder oxidation chamber.

2. The catalytic oxidizer according to claim 1, wherein the nozzles are configured and oriented for providing to the oxygenated gas a speed that further comprises an upward component.

3. The catalytic oxidizer according to claim 1, wherein the nozzles have a larger diameter on the lower part of the oxidation chamber with respect to the middle part.

4. The catalytic oxidizer according to claim 1, wherein the particle separator comprises:
    a casing provided with a lower opening for receiving the combustion gases together with the particles of unburned material and ash, and
    an upper opening to allow for the exit of clean combustion gases, wherein inside the casing there is at least one shock body configured and arranged to intercept the gases, the ash and the unburned material, such that the gases surround the shock body and abandon the particle separator through the upper opening, and the particles are retained.

5. The catalytic oxidizer according to claim 1, further comprising a heat shield that coats the inside of the oxidation chamber, and which comprises protective plates fixed to the body of the chamber.

6. The catalytic oxidizer according to claim 5, wherein the heat shield comprises first protective plates on the lower part, for protecting the combustion chamber from high temperatures as well as corrosion and wear.

7. The catalytic oxidizer according to claim 6, wherein the heat shield comprises second protective plates on the upper part for protecting the combustion chamber from high temperatures.

8. The catalytic oxidizer according to claim 5, wherein the protective plates are fixed to the chamber body in a removable way, to allow for the substitution thereof.

9. The catalytic oxidizer according to claim 1, further comprising at least one protective wall that surrounds the outer part of the oxidation chamber.

10. The catalytic oxidizer according to claim 9, further comprising two protective walls arranged coaxially: a first protective wall further inside and a second protective wall further outside.

11. The catalytic oxidizer according to claim 9, further comprising a heat-shield coating between the first protective wall and the heat shield.

12. The catalytic oxidizer according to claim 9, wherein the oxidation chamber further comprises a liquid cooling jacket that coats the first protective wall with a cooling liquid, thereby cooling the first protective wall and the second protective wall.

13. The catalytic oxidizer according to claim 12, further comprising cooling tubes coated by the liquid cooling jacket, whereby a cooling liquid circulates therethrough.

14. The catalytic oxidizer according to claim 12, wherein the liquid cooling jacket further comprises an air jacket that coats the second protective wall with air to cool said second protective wall.

15. The catalytic oxidizer according to claim 1, wherein the waste feeder comprises solid, powder, gas and liquid supply sources for supplying waste of different nature and states of aggregation both simultaneously and separately.

16. The catalytic oxidizer according to claim 15, wherein the solid supply source is attached to the upper part of the oxidation chamber, while the liquid supply source, the powder supply source and the gas supply source are attached to the lower part of the oxidation chamber.

17. The catalytic oxidizer according to claim 1, further comprising an extraction system for removing ash and slag that fall due to gravity to the lower part, called the base, of the oxidation chamber, wherein the extraction system comprises:

a gate; and at least one hatch which comprises a first hatch that is moveable or tilted in a controlled way to allow the particles to pass to the gate, from which they are removed.

18. The catalytic oxidizer according to claim 17, wherein the extraction system comprises a second hatch, also moveable or tilted in a controlled way, to remove the particles, once cooled, from the gate.

19. The catalytic oxidizer according to claim 18, wherein the first hatch and/or the second hatch are movable or tilted as a function of predetermined parameters selected from volume, weight or temperature of the accumulated particles.

20. The catalytic oxidizer according to claim 1, wherein the chamber body comprises a first door on a lower part to allow operators and personnel to access the same and the particle separator comprises a second door in the lower part and a third door in the upper part to allow operators and personnel to access the same, wherein said doors are internally cooled by liquid.

* * * * *